United States Patent
Hegazy et al.

(10) Patent No.: US 12,299,951 B2
(45) Date of Patent: May 13, 2025

(54) EDGE CENTER POINT-BASED CHARACTERIZATION OF SEMICONDUCTOR LAYOUT DESIGNS

(71) Applicant: Siemens Industry Software Inc., Plano, TX (US)

(72) Inventors: Hazem Hegazy, Cairo (EG); Ahmed Hamed-Fatehy, Giza (EG); Sara Khalaf, Cairo (EG); Omar ElSewefy, Giza (EG)

(73) Assignee: Siemens Industry Software Inc., Plano, TX (US)

( * ) Notice: Subject to any disclaimer, the term of this patent is extended or adjusted under 35 U.S.C. 154(b) by 329 days.

(21) Appl. No.: 17/823,352

(22) Filed: Aug. 30, 2022

(65) Prior Publication Data
US 2024/0071038 A1  Feb. 29, 2024

(51) Int. Cl.
*G06V 10/44* (2022.01)
*G06T 7/70* (2017.01)

(52) U.S. Cl.
CPC .......... *G06V 10/44* (2022.01); *G06T 7/70* (2017.01); *G06T 2207/30148* (2013.01)

(58) Field of Classification Search
None
See application file for complete search history.

(56) References Cited

U.S. PATENT DOCUMENTS

| | | | |
|---|---|---|---|
| 8,832,621 B1* | 9/2014 | Gennari | G06F 30/398 716/112 |
| 11,017,147 B2* | 5/2021 | Hegazy | G03F 7/70433 |
| 2007/0230770 A1* | 10/2007 | Kulkarni | G06T 7/33 382/149 |
| 2008/0320421 A1* | 12/2008 | Demaris | G06F 30/398 716/136 |
| 2020/0081352 A1* | 3/2020 | Kim | G03F 1/36 |
| 2021/0064717 A1* | 3/2021 | Hegazy | G06F 30/398 |

OTHER PUBLICATIONS

Yang, Haoyu, et al. "Detecting multi-layer layout hotspots with adaptive squish patterns." Proceedings of the 24th Asia and South Pacific Design Automation Conference. Jan. 21, 2019.
(Continued)

*Primary Examiner* — Delomia L Gilliard

(57) ABSTRACT

A computing system implementing a physical verification tool can identify edges of a geometric pattern located within a search area surrounding a point of interest in a semiconductor layout design, characterize the edges of the geometric pattern based on locations of center points of the edges from the point of interest within the search area, and generate geometrical feature vectors for the point of interest in the semiconductor layout design based on the characterization of the edges of the geometric pattern. The computing system can reconstruct the semiconductor layout design corresponding to the search area surrounding the point of interest using the geometrical feature vectors for the point of interest in the semiconductor layout design.

17 Claims, 7 Drawing Sheets

(56) References Cited

OTHER PUBLICATIONS

Pathak, Piyush, et al. "Methodology to extract, data mine and score geometric constructs from physical design layouts for analysis and applications in semiconductor manufacturing". Design-Process-Technology Co-optimization for Manufacturability X. vol. 9781. International Society for Optics and Photonics, Mar. 16, 2016.

Haoyu Yang, et al. "DeePattern: Layout Pattern Generation with Transforming Convolutional Auto-Encoder". DAC '19—Association for Computing Machinery, Las Vegas, NV, USA, Jun. 2, 2019.

Punitha Selvam, et al., "Deep learning-based hotspot prediction of via printability in process window corners", Proceedings vol. 11614, Design-Process-Technology Co-optimization XV, Feb. 22, 2021.

Fadi Batarseh, et al., "Pattern similarity profiling using semi-supervised learning algorithm", Proceedings vol. 11614, Design-Process-Technology Co-optimization XV, Feb. 22, 2021.

Haoyu Yang, et al., "Hotspot Detection Using Squish-Net", Proc. SPIE 10962, Design-Process-Technology Co-optimization for Manufacturability XIII, Mar. 20, 2019.

Jason P. Cain, Moutaz Fakhry, Piyush Pathak, Jason Sweis, Frank E. Gennari, Ya-Chieh Lai, "Pattern-based analytics to estimate and track yield risk of designs down to 7nm" Proc. SPIE 10148, Design-Process-Technology Co-optimization for Manufacturability XI. Mar. 30, 2017.

He, Kaiming, et al. "Deep residual learning for image recognition." Proceedings of the IEEE conference on computer vision and pattern recognition. 2015.

Yang, Haoyu, et al. "Lithography hotspot detection: From shallow to deep learning." 2017 30th IEEE International System-on-Chip Conference (SOCC). Sep. 5, 2017.

\* cited by examiner

EDGE CENTER POINT-BASED CHARACTERIZATION OF SEMICONDUCTOR LAYOUT DESIGNS

TECHNICAL FIELD

This application is generally related to electronic design automation and, more specifically, to edge center point-based characterization of semiconductor layout designs.

BACKGROUND

In a design flow for fabricating integrated circuits, a physical design of an integrated circuit can describe specific geometric elements, often referred to as a layout design. The geometric elements, which typically are polygons, define the shapes that will be created in various materials to manufacture the integrated circuit. Typically, a designer will select groups of geometric elements representing circuit device components, e.g., contacts, gates, etc., and place them in a design area. These groups of geometric elements may be custom designed, selected from a library of previously-created designs, or some combination of both. Once the groups of geometric elements representing circuit device components have been placed, geometric elements representing connection lines are then placed between these geometric elements according to the predetermined route. These lines will form the wiring used to interconnect the electronic devices.

Descriptions for physical designs of integrated circuits can be provided in many different formats, such as a Graphic Data System II (GDSII) format, an Open Access format, a Milkyway format, component-level netlist EDDM format, and Open Artwork System Interchange Standard (OASIS) format. These various industry formats can be used to define the geometrical information in layout designs employed to manufacture integrated circuits. Some of the formats, such as the GDSII format, can include a hierarchy of structures, each having layout elements, for example, polygons, paths, poly-lines, circles, textboxes, or the like. Once the layout design is finalized, a reticle or mask can be generated from the layout design, which can be used to manufacture the integrated circuits using a photolithographic process.

Since certain geometric shapes in a layout design of an integrated circuit can be difficult, if not impossible, to manufacture with a given process, a designer often performs a number of physical verification analyses on the layout design to identify those geometric shapes and remove them from the layout design or modify them in such a way mitigating the impact on the manufacturing process. Several of these physical verification analyses utilize pixel-based images of portions of the layout design, which can be utilized to identify the geometric shapes. While these analyses can be effective, the use of pixel-based images renders them processing and memory intensive. Other techniques to characterize the portion of the layout design, for example, numerically describing the geometric shapes around a point of interest in the layout design, allowed for granular comparisons of pattern types, but rendered reconstruction of the characterized portion of the layout design from the numerical characterization unreliable.

SUMMARY

This application discloses a computing system implementing a physical verification tool to identify edges of a geometric pattern located within a search area surrounding a point of interest in a semiconductor layout design, characterize the edges of the geometric pattern based on locations of center points of the edges from the point of interest, and generate geometrical feature vectors for the point of interest in the semiconductor layout design based on the characterization of the edges of the geometric pattern. The computing system can reconstruct the semiconductor layout design corresponding to the search area surrounding the point of interest using the geometrical feature vectors for the point of interest in the semiconductor layout design. Embodiments will be described below in greater detail.

DETAILED DESCRIPTION

Illustrative Operating Environment

Figure 1:
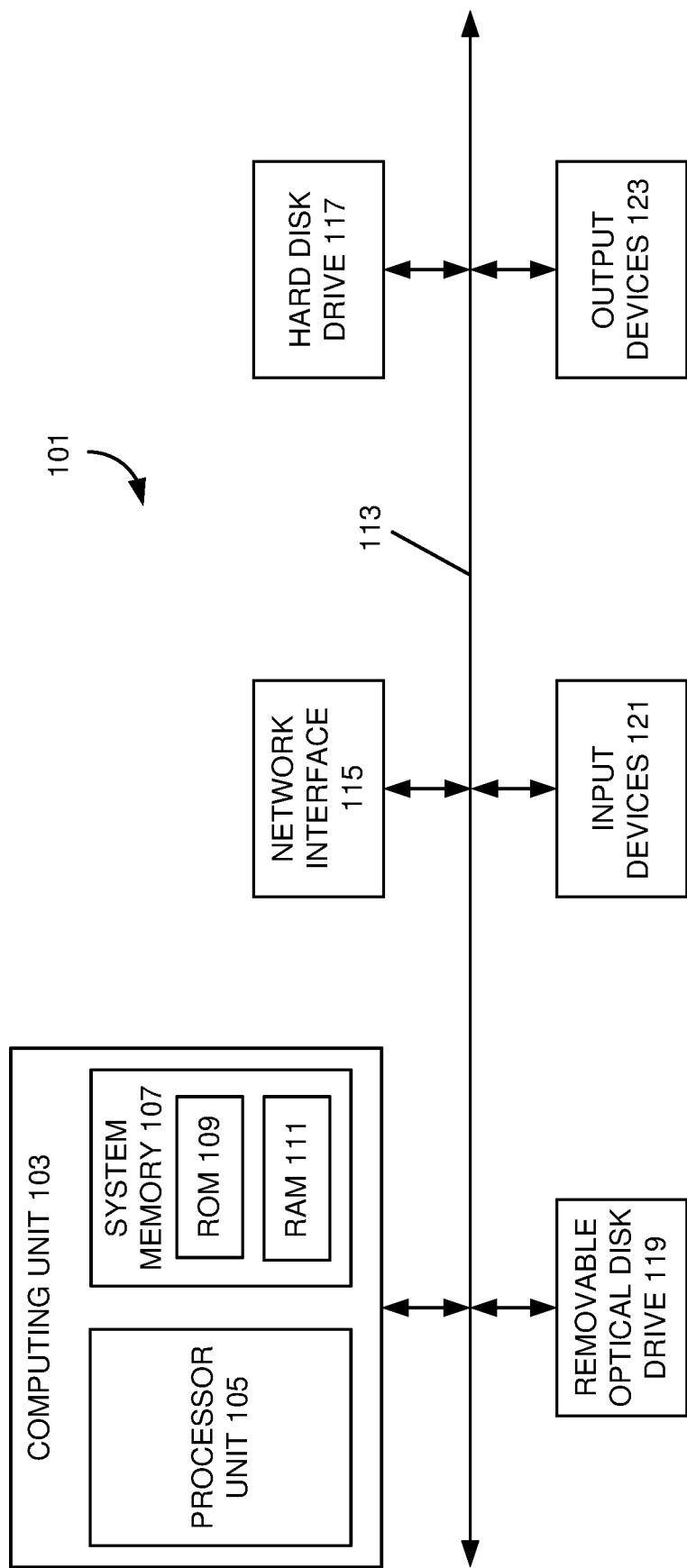
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processor unit 105 and a system memory 107. The processor unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processor unit 105.

The processor unit 105 and the system memory 107 are connected, either directly or indirectly, through a bus 113 or alternate communication structure, to one or more peripheral devices 115-123. For example, the processor unit 105 or the system memory 107 may be directly or indirectly connected to one or more additional memory storage devices, such as a hard disk drive 117, which can be magnetic and/or removable, a removable optical disk drive 119, and/or a flash memory card. The processor unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
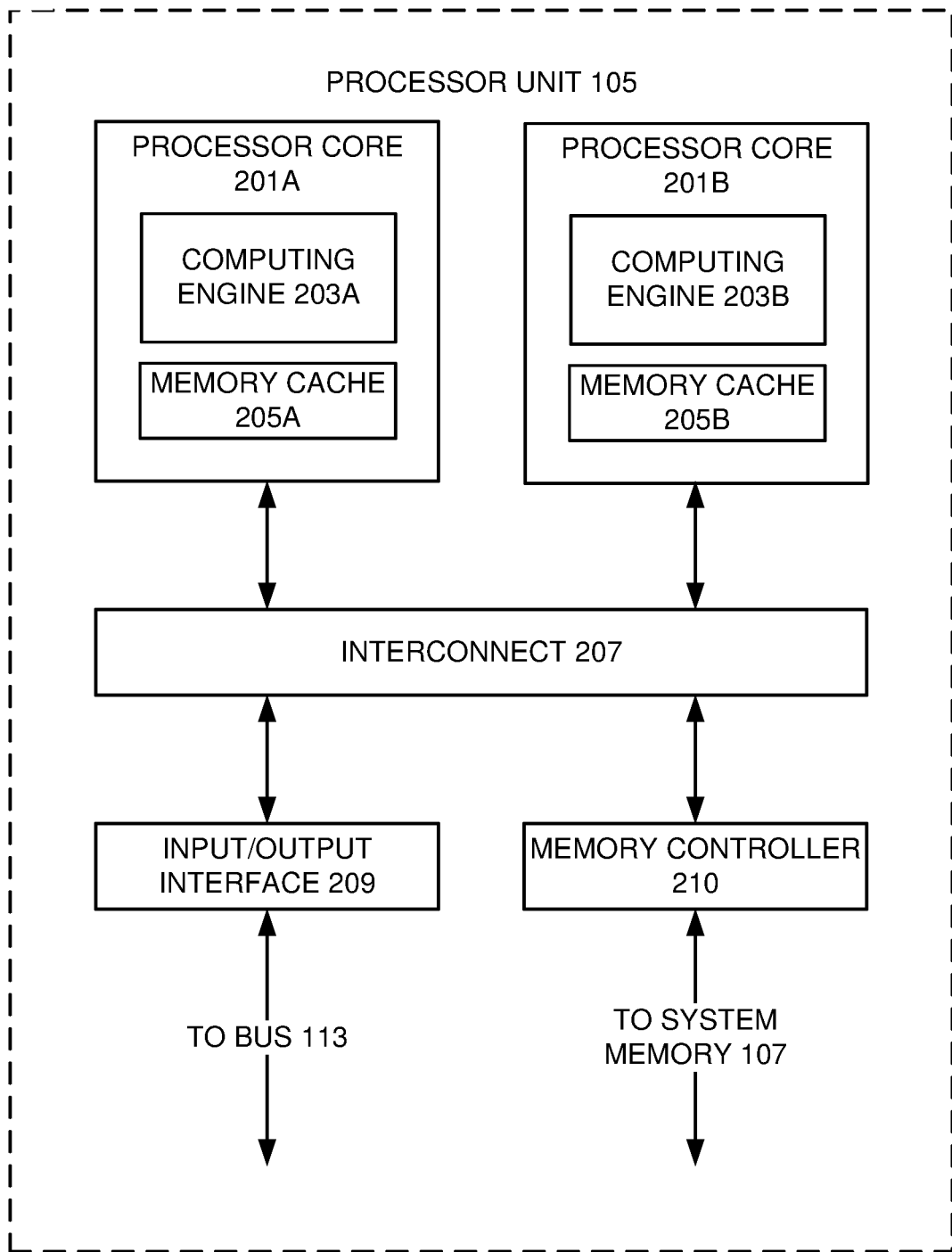

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, California, the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and is not intended to suggest any limitation as to the scope of use or functionality of alternate embodiments.

Edge-Based Self-Featurizes Characterization of Semiconductor Layout Designs

Figure 3:
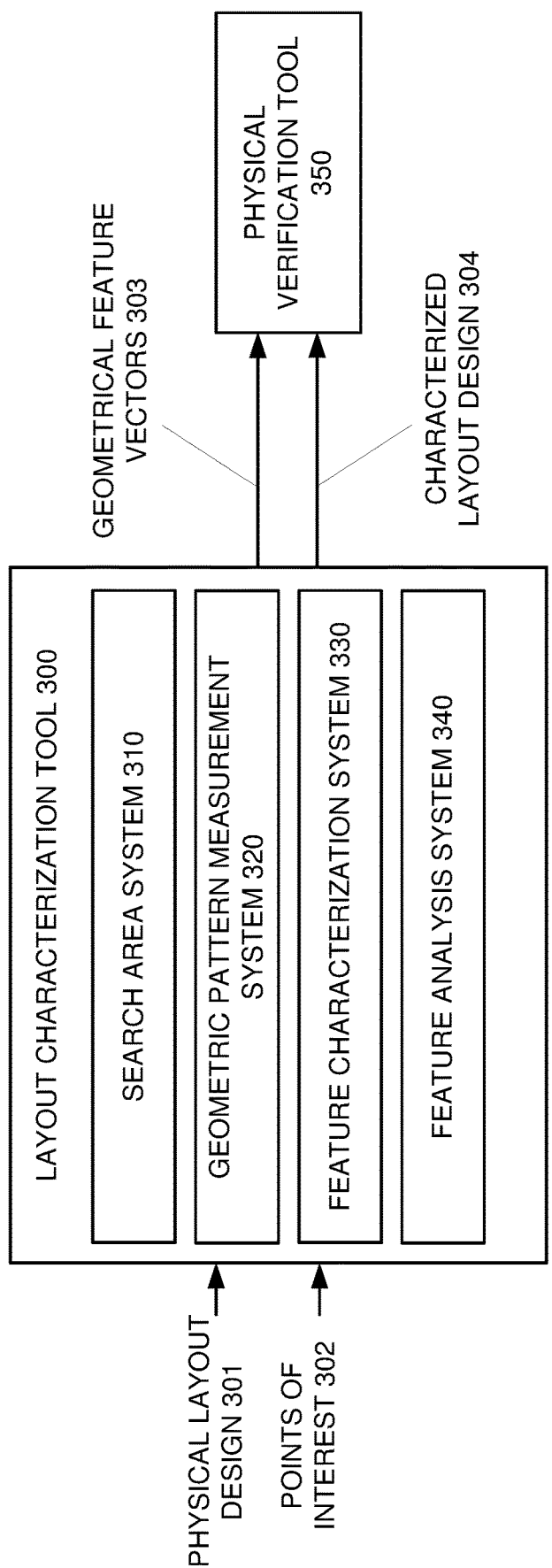
FIG. 3 illustrates an example layout characterization tool for edge center point-based characterization of semiconductor layout designs that may be implemented according to various embodiments.
Figure 6:
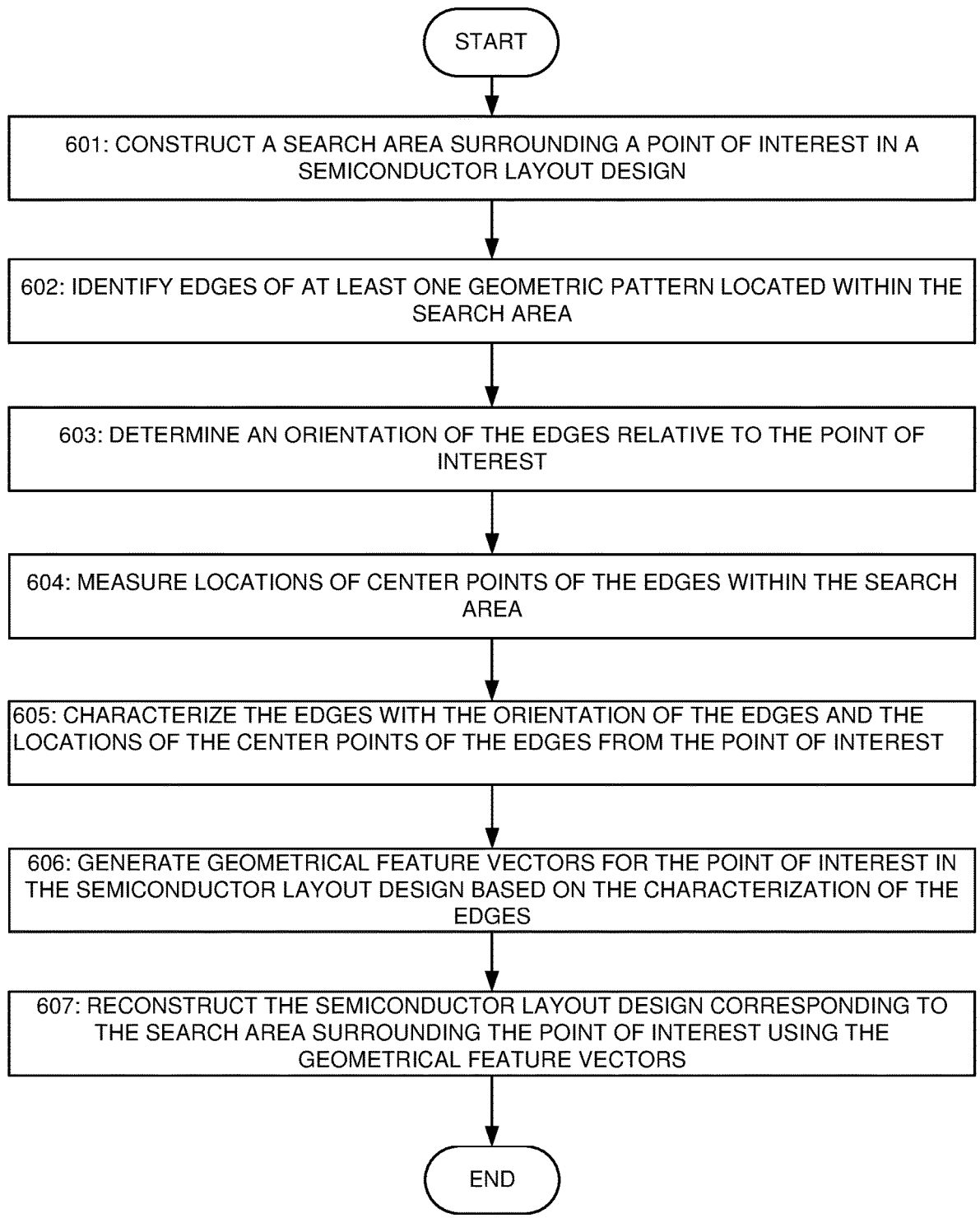
FIG. 6 illustrates an example flowchart for edge center point-based characterization of semiconductor layout designs that may be implemented according to various embodiments.

FIG. 3 illustrates an example layout characterization tool 300 for edge center point-based characterization of semiconductor layout designs that may be implemented according to various embodiments. FIG. 6 illustrates an example flowchart for edge center point-based characterization of semiconductor layout designs that may be implemented according to various embodiments. Referring to FIGS. 3 and 6, the layout characterization tool 300, for example, implemented by the computing device 101 in FIG. 1, can receive a physical layout design 301 that describes an integrated circuit as geometric information defining the shapes or patterns, such as polygon structures, capable of being created in various materials to manufacture the integrated circuit. The physical layout design 301 can be specified in a Graphic Data System II (GDSII) format, an Open Access format, a Milkyway format, an EDDM format, an Open Artwork System Interchange Standard (OASIS) format, or the like.

The layout characterization tool 300 can receive points of interest 302 corresponding to portions of the physical layout design 301 to be characterized. In some embodiments, the points of interest 302 can correspond to portions of the physical layout design 301 associated with a hotspot, for example, those structures or geometric patterns in the physical layout design 301 that could be difficult to manufacture. For example, one of the points of interest 302 can correspond to an end of a structure, which could experience pull-back or bridging caused due to light diffraction during manufacture of the integrated circuit described by the physical layout design 301. The points of interest 302 also can be placed at an edge of the physical layout design 301, for example, based on predefined selection criteria.

The layout characterization tool 300 can generate a characterized layout design 304 by identifying a context for the points of interest 302, for example, with a feature description of the geometric patterns around the points of interest 302 in the physical layout design 301. The layout characterization tool 300 can provide the characterized layout design 304 to a physical verification tool 350, for example, downstream in a design flow for the physical layout design 301, such as a design rule checking tool, a root cause analysis tool, an optical proximity correction modeling tool, or the like. In some embodiments, the physical verification tool 350 can utilize the feature description of the geometric patterns around the points of interest 302 in the physical layout design 301 to reconstruct the portion of the physical layout design 301 associated with one or more of the points of interest 302. The physical verification tool 350 can utilize the characterized layout design 304 to perform pattern matching operations, such as an exact match or a fuzzy match between different points of interest 302 in the characterized layout design 304. For example, when a design rule checking tool identifies a design rule violation corresponding to a point of interest in the characterized layout design 304, the design rule checking tool can utilize the characterized layout design 304 to identify other identical, topologically similar, or dimensionally similar points of interest in the characterized layout design 304, which can allow for a correction of the design rule violation to be propagated to all of the matching or similar structures.

In some embodiments, the layout characterization tool 300 can identify the context of geometric patterns around each of the points of interest 303 in the physical layout design 301 and generate geometrical feature vectors 303 describing the geometric patterns around the points of interest 302 in the physical layout design 301. The geometrical feature vectors 303, in some embodiments, can describe the points of interest and the edges of the geometric patterns around the points of interest 302 according to locations of the edge center points relative to the points of interest 302 and orientations of the edges relative to the points of interest 302.

The geometrical feature vectors 303 can include topological information associated with the points of interest 302, for example, identifying regional locations of center points of edges of geometric patterns present around the points of interest 302, identifying orientations, lengths, and placement for the points of interest 302 and the edges, or the like. The topological information associated with the points of interest 302 can, in some examples, be expressed as a binary value, a ternary value, or as quantized values represent quantized categories of characteristics for polygons around the point of interest 302.

The geometrical feature vectors 303 can include dimensional information associated with the points of interest 302, for example, identifying locations of center points of the geometric pattern edges relative to the points of interest 302. In some embodiments, the locations of center points of the geometric pattern edges relative to the points of interest 302 can correspond to values for distances between the locations of the center points of the geometric pattern edges and the points of interest 302 and correspond to either coordinates, such as in an x-coordinate and y-coordinate pair, of the center points of the geometric pattern edges and the points of interest 302 or to angles indicating a direction from the points of interest 302 to the center points of the geometric pattern edges. The dimensional information associated with the points of interest 302 can, in some examples, be expressed as floating point values that describe measurements made around the points of interest 302. In some embodiments, the layout characterization system 300 can generate the geometrical feature vectors 303 using an image capture system. Embodiments of the geometrical feature vectors generation will be described below with reference to FIG. 4.

Figure 4:
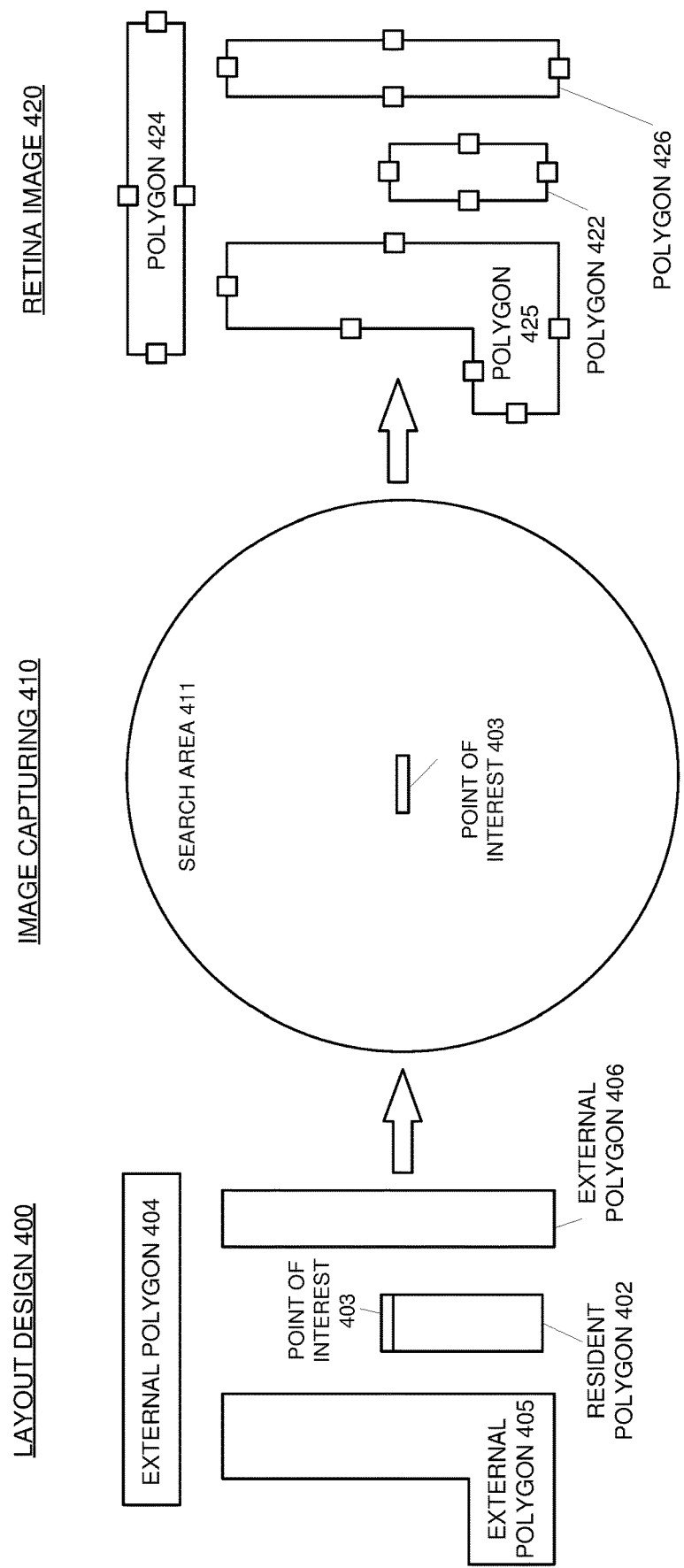
FIG. 4 illustrates an example for characterization of a point of interest in a layout design of an integrated circuit according to various embodiments.

FIG. 4 illustrates an example for characterization of a point of interest in a layout design of an integrated circuit according to various embodiments. Referring to FIG. 4, a layout design 400 can include geometric information defining different polygon structures for a portion of an integrated circuit. In this example, the layout design 400 includes a resident polygon 402 having a point of interest 403 and multiple external polygons 404-406 around the resident polygon 402 and the point of interest 403.

A Geometrical Position Signature/Surveying process can capture geometrical images 410 corresponding to the resident polygon 402 and the external polygons 404-406 within a search area 411 surrounding the point of interest 403. The geometrical patterns measured within the search area 411 can be utilized to generate geometrical feature vectors corresponding to edges of the resident polygon 402 and the external polygons 404-406. In some embodiments, the image capturing process 410 can identify edges of the resident polygon 402 and the external polygons 404-406 within the search area 411 and then characterize them, for example, with an orientation of the edges relative to the point of interest 403 and with a location of center points of the edges within the search area 411 relative to the point of interest 403. The geometrical feature vectors that include the characterization of the edges can be utilized to construct a retina image 420 of the layout design 400, which in some embodiments can correspond to a lossless reconstruction of the portion of the layout design 400 within the search area 411.

Referring back to FIGS. 3 and 6, the layout characterization tool 300 can include a search area system 310 that, in a block 601 of FIG. 6, can construct a search area surrounding at least one of the points of interest 302 in the physical layout design 302. The search area can define a continuous field in the physical layout design 301 for the layout characterization tool 300 to inspect for the presence of geometric patterns in the physical layout design 301. In some embodiments, the search area can correspond to a circle having a radius corresponding to a search distance around the points of interest 302. The search area also can correspond to a predefined space or shape surrounding the points of interest 302. In some embodiments, the search area system 310 can divide the search area into multiple regions to inspect for the presence of geometric patterns. Embodiments of search area construction will be described below in greater detail with reference to FIG. 5A.

Figure 5A:
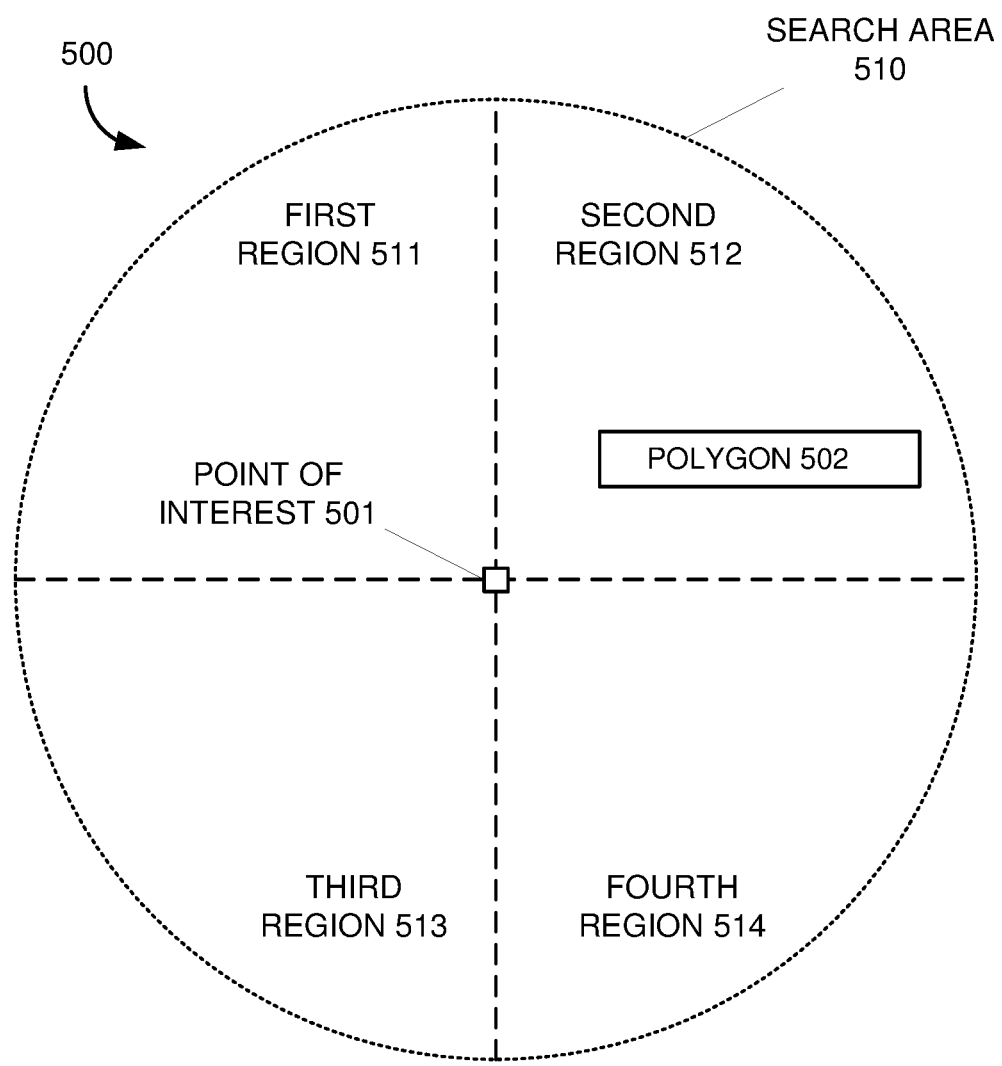
FIGS. 5A and 5B illustrate examples of edge center point-based characterization of semiconductor layout designs according to various examples.

FIG. 5A illustrates an example of edge center point-based characterization of semiconductor layout designs according to various examples. Referring to FIG. 5A, a portion of a physical layout design 500 can include a point of interest 501 and a polygon 502 corresponding to a geometrical pattern of an integrated circuit. A layout characterization tool can identify a search area 510 that surrounds the point of interest 501 to analyze for the presence of geometric patterns, such as the polygon 502. The search area 510 can correspond to an area within a predefined search distance from the point of interest 501. The layout characterization tool can identify geometric patterns of the physical layout design 500 located within the search area 510.

In some embodiments, the layout characterization tool can divide the search area into different regions, such as a first region 511, a second region 512, a third region 513, and a fourth region 514. The first region 511 can correspond to a northwest direction within the search area 510 relative to the point of interest 501. The second region 512 can correspond to a northeast direction within the search area 510 relative to the point of interest 501. The third region 513 can correspond to a southwest direction within the search area 510 relative to the point of interest 501. The fourth region 514 can correspond to a southeast direction within the search area 510 relative to the point of interest 501. The layout characterization tool can describe the presence of the identified geometric patterns within geometrical feature vectors based, at least in part, on the different regions.

Referring back to FIGS. 3 and 6, the layout characterization tool 300 can include a geometric pattern measurement system 320 that, in a block 602 of FIG. 6, can identify edges of at least one geometric pattern located within the search area. The geometric pattern measurement system 320 can inspect the portion of the physical layout design 301 corresponding to the search area to identify any polygons or other geometric patterns located within the search area. The geometric pattern measurement system 320 can utilize the identification of the polygons or other geometric patterns located within the search area to detect the edges of the identified polygons or other geometric patterns.

The geometric pattern measurement system 320, in a block 603 of FIG. 6, can determine an orientation of the edges relative to the point of interest 302. The orientation can correspond to a horizontal orientation or a vertical orientation relative to an edge associated with the point of interest 302 based, at least in part, on the identification of the edges of geometric patterns. In some embodiments, when the identified edges are non-parallel and non-orthogonal with the point of interest 302, the orientation can correspond to an angle of the identified edges relative to the point of interest 302.

The geometric pattern measurement system 320 can measure characteristics of the points of interest 302, such as the edge length, orientation in the search area, the placement of the points of interest on resident polygons, for example, a top, bottom, left, or right edge of the resident polygons, or the like. The geometric pattern measurement system 320 also can measure other characteristics of the edges within the search area, such as the edge length, the placement of the points of interest on polygons, for example, a top, bottom, left, or right edge of the polygons, or the like.

The geometric pattern measurement system 320, in a block 604 of FIG. 6, can measure locations of center points of the edges within the search area. The geometric pattern measurement system 320 can determine the center points of the identified edges, for example, by measuring the lengths of the identified edges and determining a location corresponding to an equal bifurcation of the edges based on the determined lengths of the identified edges. The locations of the bifurcations of the identified edges can correspond to the center points of the edges.

The geometric pattern measurement system 320 can correlate the center points of the edges in the search area to the points of interest 302. In some embodiments, the geometric pattern measurement system 320 can identify the location of the center points of the edges using x-y coordinates relative to the points of interest 302 along with distances of the center points of the edges from the points of interest. The geometric pattern measurement system 320 also can identify the location of the center points of the edges using a directionality of the center points of the edges from the points of interest, for example, utilizing an angle relative the search area or an angle relative to the region of the search area that includes the center point of the edge. Each angle can correspond to a measured angle within a region that corresponds to a location of an identified edge. The geometric pattern measurement system 320 also can measure distances between the points of interest 302 and the identified center points of the edges along the angles. Embodiments of geometric pattern measurement will be described below in greater detail with reference to FIG. 5B.

Figure 5B:
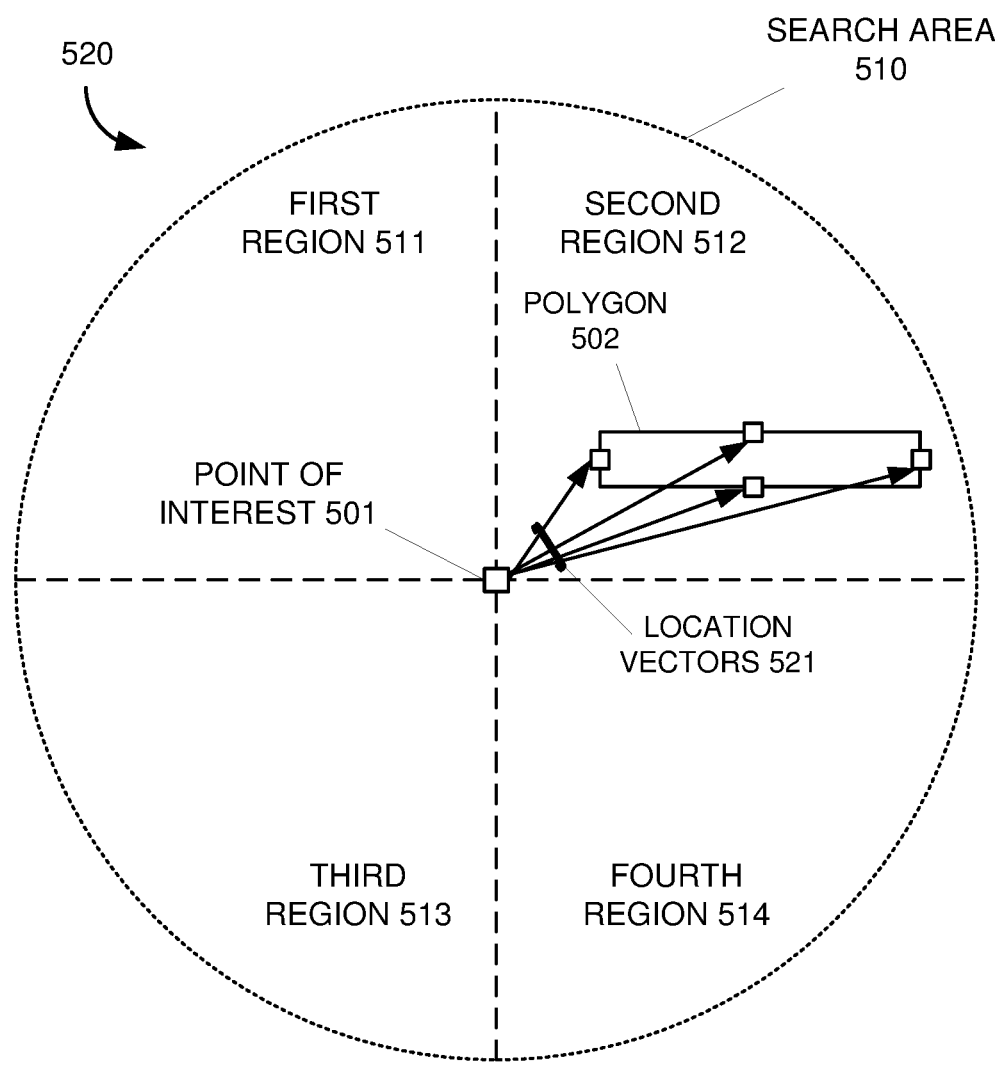

FIG. 5B illustrates an example of edge center point-based characterization of semiconductor layout designs according to various examples. Referring to FIG. 5B, the portion of the physical layout design 500 can be similar to the portion described above with reference to FIG. 5A, as the portion of the physical layout design 500 includes the point of interest 501 and the polygon 502 located in the second region 512.

A layout characterization tool can identify edges of the polygon 502, measure the lengths of the edges to determine the center points of the edges, and detect the locations of the center points of the edges within the search area 510. The detected locations of the center points of the edges within the search area 510 can correspond to x-y coordinates associated with the center points of the edges and the point of interest 501. The layout characterization tool can measure distances between the point of interest 501 and the center points of the edges of the polygon 502, for example, using a global position surveying process. In some embodiments, the layout characterization tool can derive the distances to the center points of the edges as a hypotenuse of a triangle formed using the x-y coordinates associated with the center points of the edges and the point of interest 501. The layout characterization tool also can derive an angle to the center points of the edges using the x-y coordinates associated with the center points of the edges and the point of interest 501.

The layout characterization tool can build location vectors 521 that describe the location of the center points of the edges relative to the point of interest 501, for example, by including a distance between the center points of the edges and the point of interest 501 along with either the x-y coordinate locations of the center points relative to the point of interest 501 in the search area 510 or an angle to the center points of the edges from the point of interest 501. In some embodiments, the angle to the center points of the edges in the location vectors 521 can be based on the region of the search area 510 where the center points of the edges resides. For example, the center points of the edges for the polygon 502 reside in the second region 512 of the search area 510, so the location vectors 521 can specify the angle to the center points within the second region 512 of the search area 510.

Referring back to FIGS. 3 and 6, the layout characterization tool 300 can include a feature characterization system 330 that, in a block 605 of FIG. 6, can characterize the edges with the orientation of the edges and the locations of the center points of the edges from the point of interest 302 and, in a block 606 of FIG. 6, can generate geometrical feature vectors 303 for the point of interest 302 in the semiconductor layout design based on the characterization of the edges. Each of the geometrical feature vectors 303 can correspond to a different point of interest and include information on the points of interest, such as the edge length, orientation in the search area, and edge placement on the resident polygon. The geometrical feature vectors 303 also can include information on edges in the search area surrounding the points of interest 302, such as edge length, orientation in the search area relative to the points of interest 302, edge placement on the resident polygon, locations of the center points of the edges relative to the points of interest 302, and distances of the center points from the points of interest 302.

The layout characterization tool 300 can include a feature analysis system 340 that, in a block 607 of FIG. 6, can reconstruct the semiconductor layout design corresponding to the search area surrounding the point of interest using the geometrical feature vectors 303. In some embodiments, the information included in the geometrical feature vectors 303 can allow the feature analysis system 340 to perform a lossless reconstruction of the portion of the physical layout design 301 corresponding to the search area around the points of interest 302. The layout characterization tool 300 also can output the geometrical feature vectors 303 describing the points of interest 302, which can allow the physical verification tool 350 or other external downstream tool to for the reconstruction of the portion of the physical layout design 301 corresponding to the search area around the points of interest 302 utilizing the geometrical feature vectors 303 describing the points of interest 302.

In some embodiments, the feature analysis system 340 also can perform topological clustering by analyzing the topological information of the geometrical feature vectors 303, such as the ternary or binary values in the geometrical feature vectors 303 corresponding to the identification of geometric patterns around the points of interest 302, and generating a topological signature for each of the points of interest 302. In some embodiments, each topological signature can include a series or string of binary or ternary values configured to indicate a presence or lack of presence of geometric patterns in the search area around the points of interest 302.

The feature analysis system 340 can cluster the points of interest 302 based, at least in part, on the topological signature. In some embodiments, the feature analysis system 340 can group together those points of interest 302 having the same topological signature. Since the topological signatures identify a coarse level detail of the structures around the points of interest 302, the feature analysis system 340 can perform topological clustering the points of interest 302 into a relatively small set of different clusters. The feature analysis system 340 can also can refine the topological clustering through the use of one or more dimensional information in the geometrical feature vectors 303.

In some embodiments, the feature analysis system 340 can generate the characterized layout design 304 based on the physical layout design 301 and the geometrical feature vectors 303. The feature analysis system 340 can incorporate the clusters of the points of interest 302—whether corresponding to exact matches, fuzzy matches, or topological matches—into the characterized layout design 304 for use by the downstream physical verification tool 350. The feature analysis system 340 also can incorporate the geometrical feature vectors 303 for the points of interest 302 in the characterized layout design 304, which can allow the downstream physical verification tool 350 or a manufacturing defects verification tool to perform reconstruction, clustering, root cause analysis, or the like.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to design processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   identifying, by a computing system, edges of a geometric pattern located within a search area surrounding a point of interest in a semiconductor layout design;
   measuring, by the computing system, lengths of the identified edges to determine locations of center points of the edges that correspond to an equal bifurcation of the measured lengths of the edges;

determining, by the computing system, directionalities of the locations of the center points of the edges relative to the point of interest within the search area and determining distances between the locations of the center points of the edges and the point of interest;

characterizing, by the computing system, the edges of the geometric pattern based, at least in part, on the directionalities of the locations of the center points of the edges relative to the point of interest within the search area and the distances between the locations of the center points of the edges and the point of interest; and generating, by the computing system, geometrical feature vectors for the point of interest in the semiconductor layout design based on the characterization of the edges of the geometric pattern, wherein the geometrical feature vectors are configured to allow reconstruction of the semiconductor layout design corresponding to the search area.

2. The method of claim 1, further comprising:
determining, by the computing system, an orientation of the edges relative to the point of interest; and
characterizing, by the computing system, the center points of the edges with the orientation of the edges relative to the point of interest.

3. The method of claim 2, wherein the geometrical feature vectors for the point of interest in the semiconductor layout design include the orientation of the edges relative to the point of interest.

4. The method of claim 1, wherein characterizing the edges further comprises dividing the search area surround the point of interest into a plurality of measurement regions, and wherein the location of the center points of the edges from the point of interest corresponds to at least one of a set of coordinates or an angle and a distance relative to the measurement regions.

5. The method of claim 1, further comprising reconstructing, by the computing system, the semiconductor layout design corresponding to the search area surrounding the point of interest using the geometrical feature vectors for the point of interest in the semiconductor layout design.

6. The method of claim 5, wherein the reconstruction of the semiconductor layout design using the geometrical feature vectors for the point of interest is lossless.

7. A system comprising:
a memory system configured to store computer-executable instructions; and
a computing system, in response to execution of the computer-executable instructions, is configured to:
identify edges of at least one geometric pattern located within a search area surrounding a point of interest in a semiconductor layout design;
measure lengths of the identified edges to determine locations of center points of the edges that correspond to an equal bifurcation of the measured lengths of the edges;
determine directionalities of the locations of the center points of the edges relative to the point of interest within the search area and determining distances between the locations of the center points of the edges and the point of interest;
characterize the edges of the geometric pattern based, at least in part, on the directionalities of the locations of the center points of the edges relative to the point of interest within the search area and the distances between the locations of the center points of the edges and the point of interest; and
generate geometrical feature vectors for the point of interest in the semiconductor layout design based on the characterization of the edges of the geometric pattern, wherein the geometrical feature vectors are configured to allow reconstruction of the semiconductor layout design corresponding to the search area.

8. The system of claim 7, wherein the computing system, in response to execution of the computer-executable instructions, is further configured to:
determine an orientation of the edges relative to the point of interest; and
characterize the center points of the edges with the orientation of the edges relative to the point of interest.

9. The system of claim 8, wherein the geometrical feature vectors for the point of interest in the semiconductor layout design include the orientation of the edges relative to the point of interest.

10. The system of claim 7, wherein the computing system, in response to execution of the computer-executable instructions, is further configured to characterize the edges by dividing the search area surround the point of interest into a plurality of measurement regions, and wherein the locations of the center points of the edges from the point of interest corresponds to at least one of a set of coordinates or an angle and a distance relative to the measurement regions.

11. The system of claim 7, wherein the computing system, in response to execution of the computer-executable instructions, is further configured to reconstruct the semiconductor layout design corresponding to the search area surrounding the point of interest using the geometrical feature vectors for the point of interest in the semiconductor layout design, wherein the reconstruction of the semiconductor layout design using the geometrical feature vectors for the point of interest is lossless.

12. An apparatus comprising at least one computer-readable memory device storing instructions configured to cause one or more processing devices to perform operations comprising:
identifying edges of at least one geometric pattern located within a search area surrounding a point of interest in a semiconductor layout design;
measuring lengths of the identified edges to determine locations of center points of the edges that correspond to an equal bifurcation of the measured lengths of the edges;
determining directionalities of the locations of the center points of the edges relative to the point of interest within the search area and determining distances between the locations of the center points of the edges and the point of interest;
characterizing the edges of the geometric pattern based, at least in part, on the directionalities of the locations of the center points of the edges relative to the point of interest within the search area and the distances between the locations of the center points of the edges and the point of interest; and
generating geometrical feature vectors for the point of interest in the semiconductor layout design based on the characterization of the edges of the geometric pattern, wherein the geometrical feature vectors are configured to allow reconstruction of the semiconductor layout design corresponding to the search area.

13. The apparatus of claim 12, wherein the instructions are configured to cause one or more processing devices to perform operations further comprising:
  determining an orientation of the edges relative to the point of interest; and
  characterizing the center points of the edges with the orientation of the edges relative to the point of interest.

14. The apparatus of claim 13, wherein the geometrical feature vectors for the point of interest in the semiconductor layout design include the orientation of the edges relative to the point of interest.

15. The apparatus of claim 12, wherein characterizing the center points of the edges further comprises dividing the search area surround the point of interest into a plurality of measurement regions, and wherein the locations of the center points of the edges from the point of interest corresponds to at least one of a set of coordinates or an angle and a distance relative to the measurement regions.

16. The apparatus of claim 12, wherein the instructions are configured to cause one or more processing devices to perform operations further comprising reconstructing the semiconductor layout design corresponding to the search area surrounding the point of interest using the geometrical feature vectors for the point of interest in the semiconductor layout design.

17. The apparatus of claim 16, wherein the reconstruction of the semiconductor layout design using the geometrical feature vectors for the point of interest is lossless.

* * * * *